J. J. REICHERTS & D. TIPTON.
Combined Field Roller and Planter.
No. 210,962. Patented Dec. 17, 1878.
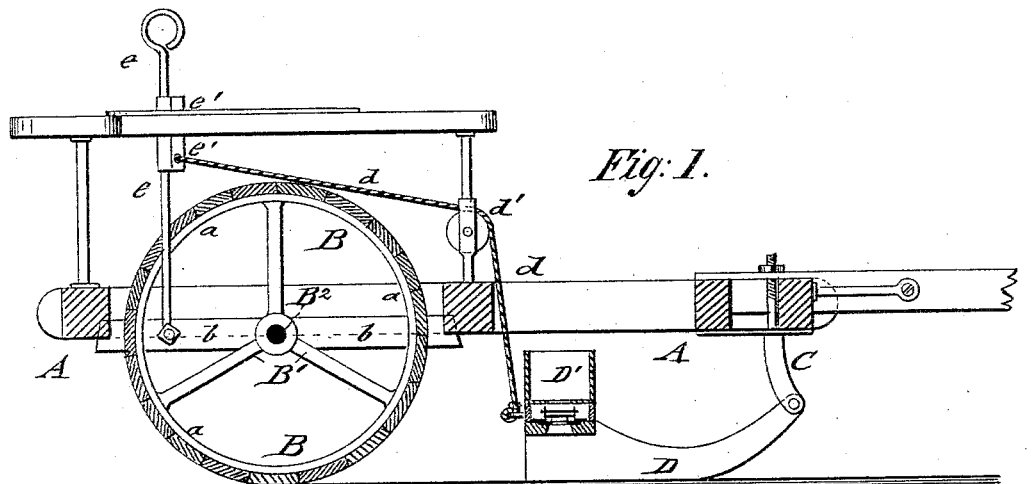
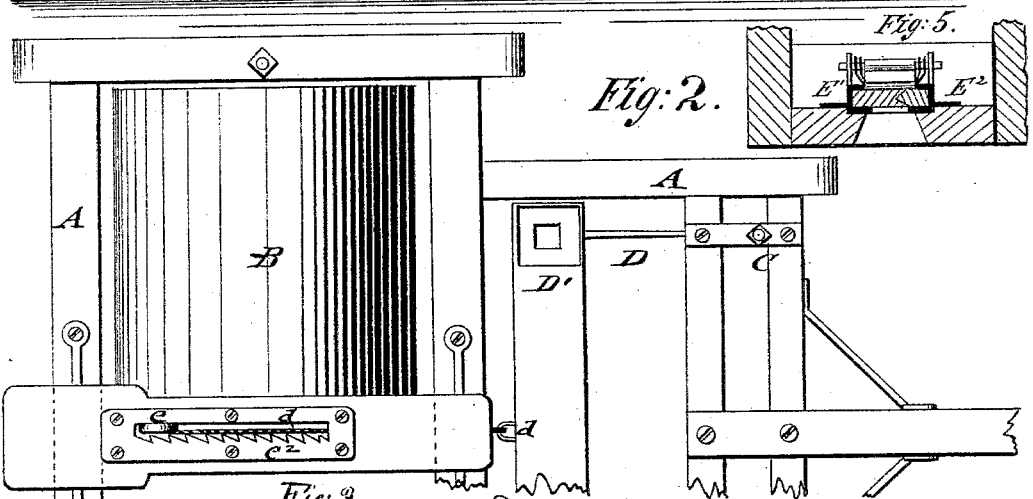
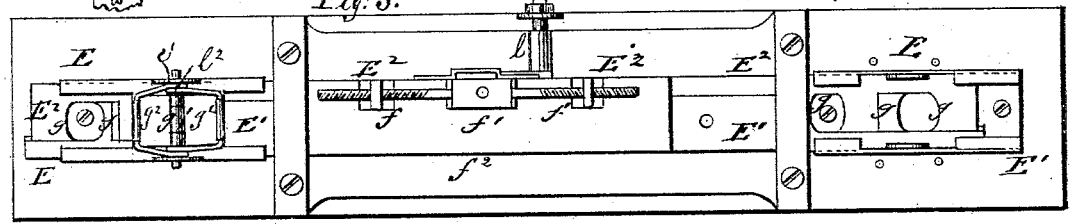
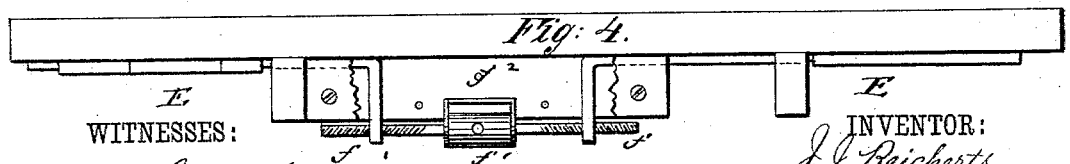
WITNESSES:
A. Schehl.
C. Sedgwick.
INVENTOR:
J. J. Reicherts
D. Tipton
BY Munn & Co
ATTORNEYS.

UNITED STATES PATENT OFFICE.

JOHN J. REICHERTS AND DAVID TIPTON, OF DELAWARE, OHIO.

IMPROVEMENT IN COMBINED FIELD ROLLER AND PLANTER.

Specification forming part of Letters Patent No. 210,962, dated December 17, 1878; application filed October 21, 1878.

*To all whom it may concern:*

Be it known that we, JOHN J. REICHERTS and DAVID TIPTON, of Delaware, in the county of Delaware and State of Ohio, have invented a new and Improved Seed-Planter, of which the following is a specification:

In the accompanying drawings, Figure 1 represents a vertical longitudinal section of our improved field roller and planter; Fig. 2, a top view of the same; and Figs. 3, 4, and 5 are, respectively, a plan view, a front view with part broken off, and a vertical transverse section of our improved seed-dropping mechanism.

Similar letters of reference indicate corresponding parts.

This invention is intended to furnish for agricultural purposes an improved field roller and planter, by which the seed is dropped by a simple and easily-adjusted mechanism, and then covered by the roller, the ground being crushed and broken and left in good condition for after operations.

The invention will first be described in connection with the drawings, and then pointed out in the claim.

The dropping mechanism is made of a longitudinal slide-section and two adjustable sections, which form, by suitable recesses and cheeks, receiving-pockets for the seed from the seed-hoppers.

The adjustable slide-sections are set by a right and left hand screw along the main section to receive a greater or less quantity of seed. The slide-sections are guided and operated together so as to drop the seed alternately into the boxes of the runners and then on the ground.

Referring to the drawings, A represents the supporting-frame of our improved field roller and planter. To the front part of the frame A is attached the tongue to which the horses are hitched for pulling the roller and planter. The rear part of frame A is wider than the front part, to provide sufficient space for the field-roller B, which takes up more space laterally than the planting mechanism at the front part of the frame A.

The field-roller B is made of two sections, which revolve by center hubs of their cast-metal heads $B^1$ on a fixed shaft, $B^2$, of frame A. The cast heads have circumferential flanges $a$, to which the wooden or other staves or shell-sections of the roller are bolted. The fixed shaft passes through a center-piece, $b$, that extends between the roller-sections, so as to separate the same and furnish an intermediate support for shaft $B^2$.

The roller will pulverize or crush clods in moderately dry ground, and will leave the field in good condition for after operations. It may be used with advantage in a wet season, or when the ground is damp, as the roller, owing to its larger surface, will not pack the ground as much as the cast wheels of the common corn-planters. The roller serves, therefore, for supporting the planter, as well as for covering the seed dropped.

To fixed standards C of the front part of frame A are pivoted the runners D, the standards being recessed to receive the front ends of the runners. The rear ends of the runners are gradually spread open to receive the seed from the dropping-boxes $D'$ above and conduct it to the furrows formed by the runners. The runners and dropping-boxes are connected by transverse pieces, to which a cord or chain, $d$, is attached and passed over a guide-pulley of the frame A to a hand-lever, $e$, and pawl $e^1$, that engages a ratchet or rack device, $e^2$, for the purpose of raising or lowering the runners, according to the depth they are desired to penetrate the ground, and for going to and from the field, the adjusting-lever being pivoted to the center-piece $b$, between the roller-sections.

The seed-dropping attachment E is at the bottom of seed-boxes $D'$, and is to be operated by a hand-lever connected to a crank, $l$, which is attached to the central block $f^2$ of the dropping-slides. The slides consist of two bars, $E^2 E^2$, and a continuous slide-piece, $E^1$, the bars $E^2$ being adjustable endwise by means of a right and left hand screw-bolt, $f$, and collar $f^1$ of the center-block $f^2$, to which latter the piece $E^1$ is attached. The adjustable pieces $E^2$ pass, by angular arms, through slots of block $f^2$, the arms having nuts for being acted upon by screw-rod $f$.

The pieces $E^2$ are guided by a V-shaped tongue and groove on the slide-piece $E^1$, and the slide is held in place by the flanged edges of the bottom plate, over which the slides move. The slide-piece $E^1$ forms at each end, by means of recesses and cheeks $g$, two pockets or spaces, that receive the seed from boxes D' and drop it in turn through the openings in the bottom of boxes D'.

$g^1$ is the cut-off, consisting of two plates, $g^2$, hinged upon a pin that is supported by the studs $c'$, which plates bear upon slide E, and are kept in contact therewith by springs $l^2$. The outer ends of plates $g^2$ are bent over upon the springs $l^2$ for the purpose of connecting them and to form a rounded edge, that will not cut the seed.

By removing the pin of the hinge the plates $g^2$ may be taken out for repairs.

The construction described forms a very simple and efficient dropper. The dropping-slides can be adjusted by screw-turning collar $f^1$, and the recesses $g$ increased or diminished in size; and this may be done while the machine is in operation, by means of a pin inserted in the socket-holes of collar $f^1$.

The entire planting attachment may be removed if it is desired to use the roller alone. There is no gearing or other expensive parts. The field-roller and planting attachment can be furnished at less cost than most seed-planters in use, with the additional advantage of a roller for separate use.

Having thus described our invention, we claim as new and desire to secure by Letters Patent—

The dropping-slides of a seed-planter consisting of a continuous recessed slide-piece, $E^1$, and the bars $E^2$, connected by tongue and groove, said bars having angular arms, that pass through block $f^2$, and being adjustable by the right and left screw and collar $f^1$, as and for the purpose specified.

JOHN J. REICHERTS.
DAVID TIPTON.

Witnesses:
C. H. McELROY,
C. V. OWSTON.